Sept. 10, 1935.  J. G. BARBOUR  2,014,269
METHOD OF MAKING TRICKLING FILTER FLOOR BLOCKS
Filed Oct. 5, 1933  2 Sheets-Sheet 1
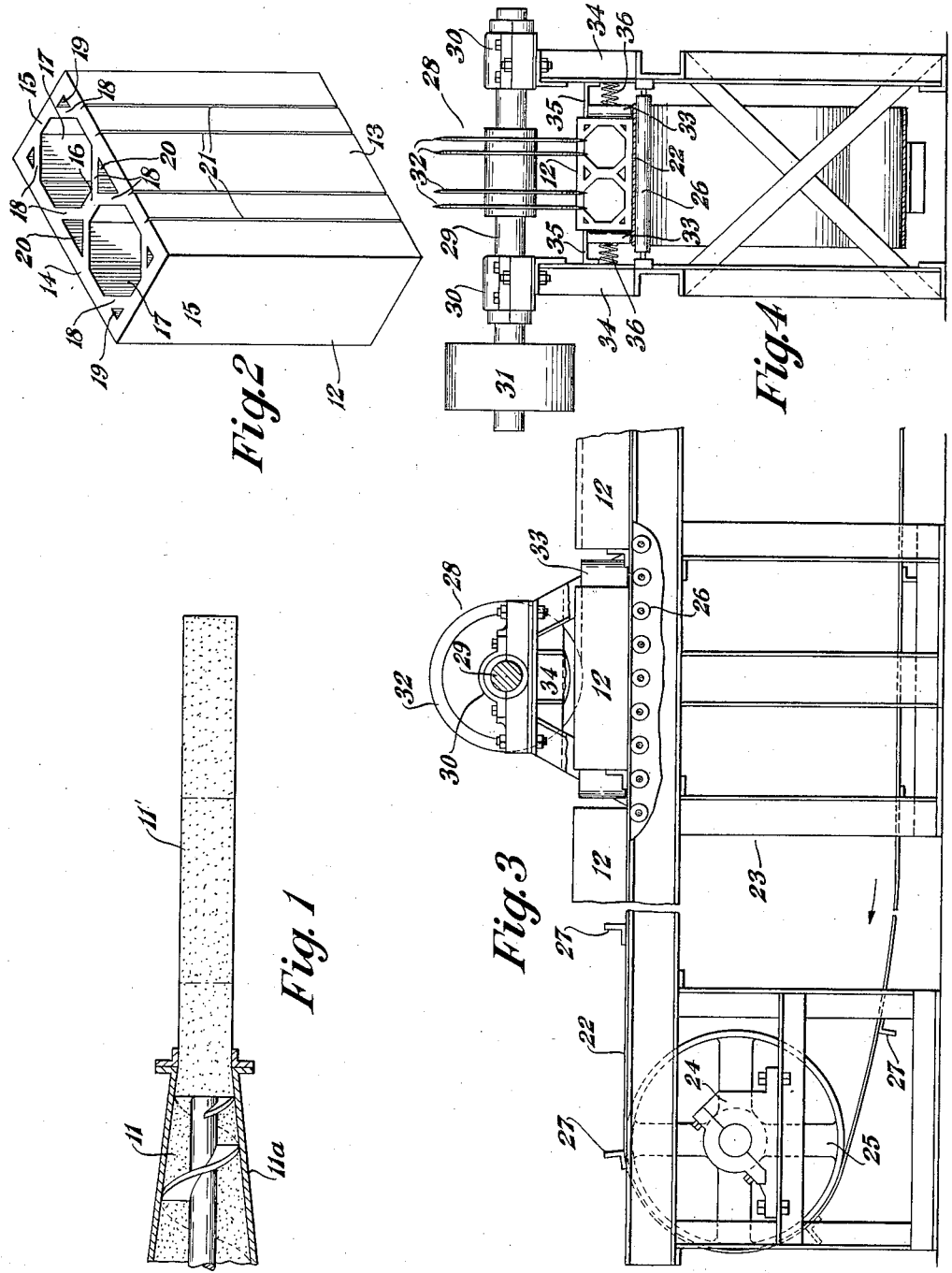
Inventor
J. G. Barbour
By Frease and Bishop
Attorneys Sept. 10, 1935.  J. G. BARBOUR  2,014,269

METHOD OF MAKING TRICKLING FILTER FLOOR BLOCKS

Filed Oct. 5, 1933  2 Sheets-Sheet 2

Inventor

J. G. Barbour

By Frease and Bishop
Attorneys

Patented Sept. 10, 1935

2,014,269

UNITED STATES PATENT OFFICE 2,014,269

METHOD OF MAKING TRICKLING FILTER FLOOR BLOCKS

James G. Barbour, Canton, Ohio, assignor to The Metropolitan Paving Brick Company, Canton, Ohio, a corporation of Ohio Application October 5, 1933, Serial No. 692,313

6 Claims. (Cl. 25—156)

The invention relates to trickling filter floor constructions such as disclosed in my prior Patent No. 1,883,468, and in my prior application, filed July 12, 1930, Serial No. 467,516.

More particularly, the invention relates to an improved block for use in trickling filter floor constructions, and to an improved method of making the block.

The trickling filter floor embodied in my prior inventions above referred to includes single unitary blocks or tiles placed end to end to form longitudinal rows side by side for supporting directly thereon the filter bed of coarse aggregate, through which sewage effluent may trickle in thin streams for aerating and purifying the same before it is discharged into an open water course.

Each of these blocks or tiles has been provided with a single tubular drainage passage or trough located longitudinally therethrough and having a narrow longitudinal slot in its upper side, for collecting and carrying off sewage effluent trickling thereinto from the filter bed.

In order to properly aerate and purify the sewage effluent, it is essential to provide a maximum longitudinal slot area per floor unit area, to secure adequate ventilation between the drainage troughs and the filter bed, because the sewage is purified by the action of bacteria which form upon the floor and it is essential to the life of the bacteria that the same be thoroughly oxidized or aerated.

It is therefore an object of the present invention to provide a trickling filter floor formed of single unitary blocks so constructed as to provide increased ventilation.

The filter bed occupies a relatively large area, and the sides thereof are confined by correspondingly extensive walls, preferably of concrete. These walls are erected to a predetermined height above the blocks forming the trickling filter floor in order to retain a filter bed having the required depth. Consequently, it is desirable to keep the height of the tiles at a minimum in order to reduce the labor and expense of building the concrete walls.

It is therefore another object of the present invention to provide a trickling filter floor formed of blocks having the required drainage capacity and reduced height.

Vitrified material such as clay and the like, has been accepted as the preferred material for making filter floor blocks, because of its inherent advantages with respect to weight, handling, transporting, and cheapness.

Such floor blocks may be made by the usual forming, drying and burning operations employed in producing ceramic products, but due to the required hollow cross section of the blocks, it is necessary to use a relatively soft clay column in the forming operation. Also, the blocks in finished form are hollow, relatively long, and necessarily somewhat unsymmetrical or unbalanced due to the requirement of slots in the upper side of the drainage troughs.

For these reasons, it becomes very difficult and practically impossible to dry and burn such blocks without warpage or breakage resulting from unequal expansion and contraction, so as to produce blocks which have smooth and unbroken surfaces and which are true and capable of being accurately aligned in a filter floor.

Accordingly, it is a further object of the present invention to provide an improved method of making vitrified hollow floor blocks in which distortion or warpage of the blocks is substantially eliminated, so as to produce blocks possessing a high degree of trueness and accuracy of alignment.

A further object of the present invention is to provide a particular vitrified block construction and design which is adapted to be initially formed in an ordinary extrusion press, such as an auger brick machine, and which may be handled and subjected to drying, cutting and burning operations without material distortion or warpage.

A still further object is to provide a true and accurately aligned hollow filter floor block having slots in its upper wall, and all exposed surfaces of the block being smooth so as to promote free flow of the effluent thereover and to prevent collection of solid matter thereon.

Other objects include the provision of trickling filter floor blocks of a size and weight facilitating easy handling, and at the same time requiring a minimum number of units to form a floor of given area.

These and ancillary objects are attained by constructing hollow vitrified blocks each having walls of substantially uniform thickness and provided with two side by side parallel longitudinal drainage troughs, there being a longitudinal slot formed in the upper side of each trough; and by first forming the improved blocks in a shape symmetrical about a vertical or horizontal plane passing through its longitudinal axis, drying the blocks, then cutting a longitudinal slot at the upper side of each drainage trough, and then burning the blocks.

For drainage inspection and flushing purposes, it is necessary to provide communication through the end walls of the filter bed with the ends of all of the drainage troughs formed by the longitudinal rows of filter floor blocks, and it is essential that said end walls are not weakened to any material extent.

In the present invention this is accomplished by providing hollow drainage or flushing blocks at each end of the filter bed communicating with the ends of all of the drainage troughs, each of said blocks having a laterally enlarged or bell-shaped portion communicating with two of said drainage troughs and a reduced portion extending through the end wall.

Referring to the drawings forming part hereof:

Figure 1 is a fragmentary sectional view of the outlet end of an auger brick machine, showing a clay column being extruded therefrom;

Fig. 2 is a perspective view of one of the improved filter floor blocks as cut from the clay column, the block being shown on end in drying position, and the normally upper surface thereof being scored for subsequent cutting;

Fig. 3 is a side elevation with parts broken away, of the apparatus for cutting the slots in the upper wall of the floor blocks after the drying operation, and before the burning operation;

Fig. 4 is an end view thereof;

Similar numerals refer to similar parts throughout the drawings.

Figure 5:
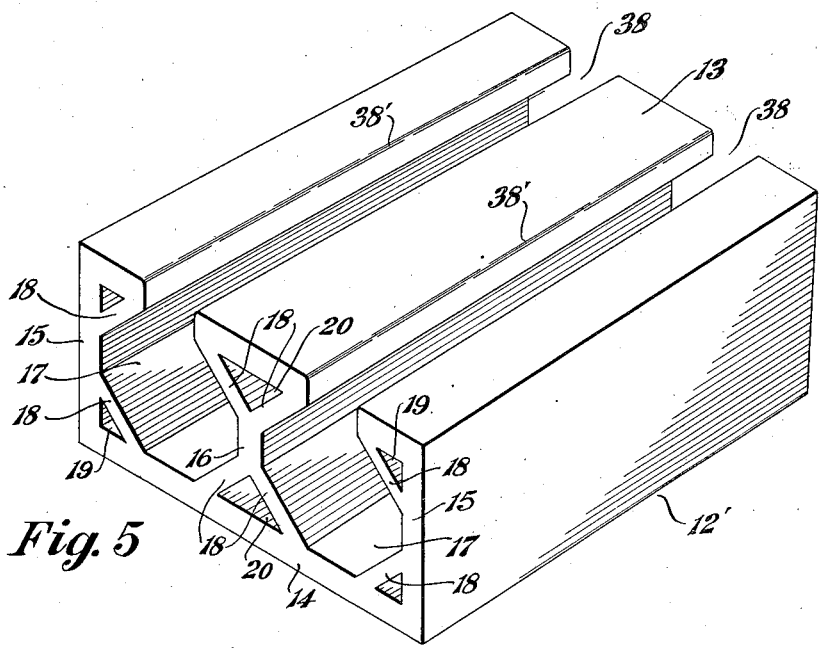
Fig. 5 is a perspective view of one of the finished filter floor blocks.

In forming the improved filter floor blocks utilized in constructing the present improved filter floor, the vitreous clay 11 of which the blocks are preferably made, is extruded from any suitable extrusion apparatus, such as the auger brick machine indicated at 11a.

The clay is extruded in the form of a relatively soft column 11' which has substantially the required hollow cross section of the improved filter floor blocks. Due to the fact that longitudinal drainage slots are required in one side only of the finished blocks, the cross sectional shape thereof is unsymmetrical or unbalanced.

Accordingly, if the cross sectional shape of the column 11' were identical with the finished cross sectional shape of the blocks, it would be practically impossible to obtain uniform density of the clay throughout the extruded column. Consequently, in drying and burning the blocks, unequal expansion and contraction would occur because of the non-uniform density of the blocks.

Moreover, if longitudinal slots were formed in one side of the column by the extrusion apparatus, when the blocks cut therefrom were dried, the walls adjoining the slots would have insufficient support due to the relative softness of the clay which is required in order to extrude a column having the required cross sectional shape, and said walls would therefore move toward or away from each other so as to become distorted or warped.

Furthermore, if the blocks were cut from a column having the longitudinal slots formed therein, it would be practically impossible to handle the blocks previous to the drying operation without distorting the walls thereof.

Since it is vitally important to provide hollow filter floor blocks which are true and accurately aligned, applicant has invented a novel method of making hollow filter floor blocks having longitudinal slots in one side thereof, which method successfully overcomes all of the foregoing difficulties.

According to the present improved method, the clay column 11' as extruded is hollow and symmetrical about either a horizontal or a vertical plane. The cross section of the column 11 is clearly shown in Fig. 2 at the end of one of the blocks 12 which are cut from the column.

The walls of the clay column 11 and of each of the blocks 12 are of substantially uniform thickness, and include the normally top wall 13, bottom wall 14, and side walls 15. A longitudinal intermediate partition wall 16 divides the interior of the block into two equal drainage channels 17 extending throughout the length of the block.

Angular walls 18, coextensive with the length of the blocks, are preferably provided at each corner of each of the channels 17, making each of the drainage troughs octagonal in cross section. Preferably, a triangular relatively small longitudinal void or passage 19 is formed in each corner portion of the block 12, adjacent one of the angular walls 18 and coextensive therewith. Likewise, a larger triangular longitudinal passage 20 is formed adjacent the central portion of the top and bottom walls 13 and 14 and between the drainage channels 17.

The purpose of the triangular passages 19 and 20 is to make all of the walls of the block substantially uniform for extruding, drying and burning purposes, and to minimize the weight of the block.

It is apparent that the cross sectional shape of the column 11' and each of the blocks 12 cut therefrom is symmetrical about either a horizontal or a vertical plane so that the density of the extruded column is substantially uniform throughout, and distortion or warping of the blocks during the drying operation is substantially eliminated.

As the column 11' is extruded, the normally upper surface of the column, that is, the outer surface of each wall 13, is preferably scored longitudinally along laterally spaced lines to form grooves indicated at 21, by any suitable means. All of the scored grooves 21 are parallel and extend longitudinally of the column, and each pair of the scored grooves 21 is located over the central portion of one of the drainage troughs 17 and spaced apart a predetermined distance. This distance is determined by the minimum size of the aggregate to be used in the filter bed, and is preferably about one and one-half inches. Preferably, the corners of each of the grooves 21 are slightly rounded, as shown.

After the blocks 12 have been cut from the column they are placed on end, as shown in Fig. 2, and dried according to the usual methods of drying clay or ceramic products. After the drying operation is completed, the blocks 12 are sufficiently firm to permit further handling and processing without distortion.

The blocks 12 are then placed upon the conveyer belt 22 of the cutting apparatus shown in Figs. 3 and 4, with their walls 13 uppermost. The cutting apparatus preferably includes a frame indicated generally at 23, having a conveyer drum rotatably mounted thereon at each end in suitable bearings 24, one of said drums being shown at 25.

The conveyer belt 22 is preferably an endless belt of flexible material driven by any suitable means and extending around the drums 24. The upper surface of the belt 22 is maintained in a horizontal position, either by plates or by means of rollers 26, in order to provide a horizontal carrying surface for the blocks 12. The belt 22 is provided at intervals with angular flights indicated at 27 for abutting the rear end of one of each of the blocks 12.

As the belt 22 travels in the direction of the arrow, a block 12 is placed upon the upper surface thereof in front of each flight 27 and is carried under the cutting means indicated generally at 28. The cutting means 28 preferably includes a shaft 29 journalled in suitable bearings 30 supported on the frame and having a driving pulley 31 at one end for connection to suitable driving means (not shown).

Preferably, a gang of rotary cutting disks 32, which may be four in number as shown, is secured on the shaft 29, and each of the disks 32 is adapted to register with and enter one of the scored grooves 21 and to cut or slit through the top wall 13 along the laterally spaced grooves of each block, as it passes under the disks.

Means for centering the blocks 12 on the conveyer with respect to the cutting disks 32 preferably includes a guide member 33 located under the shaft 29 at each side of the belt 22. Preferably, each guide member 33 is movably connected to the adjacent frame member 34 by means of an angle member 35, and coil spring means 36 is interposed between each frame member 34 and the adjacent guide 33 for resiliently urging the guides towards the blocks 12.

By passing the blocks 12 through the improved cutting apparatus after the drying operation and before the burning operation, a longitudinal strip is removed between each pair of slits in the top wall 13 of each block to form two parallel longitudinal slots 38 each coextensive with one of the drainage troughs 17 and communicating therewith, as shown in Fig. 5, one slot being located directly over the center portion of each drainage trough 17.

The rounded corners of the scored grooves 21 produce rounded corners 38' at the upper edges of the slots 38, and the grooves cooperate with the cutting disks 32 to produce smooth inner surfaces on the walls defining the slots of the finished blocks, so that sewage effluent may trickle through the slots without encountering any resistance, as from rough walls.

After the blocks have been slotted as above described, they are burned and vitrified according to usual methods, to produce the finished block 12' indicated in Fig. 5. The particular design and cross sectional shape of each of the blocks 12' is such that any distortion or warpage of the walls during the burning operation is substantially eliminated, because the blocks have walls of substantially uniform thickness throughout, and are symmetrical except for the presence of the slots 38.

Also, the portions of the wall 13 adjoining the slots 38 are amply supported by the angular walls 18 connecting said portions to the side walls 15 and the partition wall 16, and the side walls 15 and partition wall 16 are prevented from moving toward or away from each other during the burning operation by means of the angular walls 18 which connect them to the bottom wall 14.

It has been demonstrated in actual practice that by making filter floor blocks of the present improved design, and according to the present improved method, the finished blocks possess a greater trueness and accuracy of alignment than has been attained in any prior construction.

Figure 6:
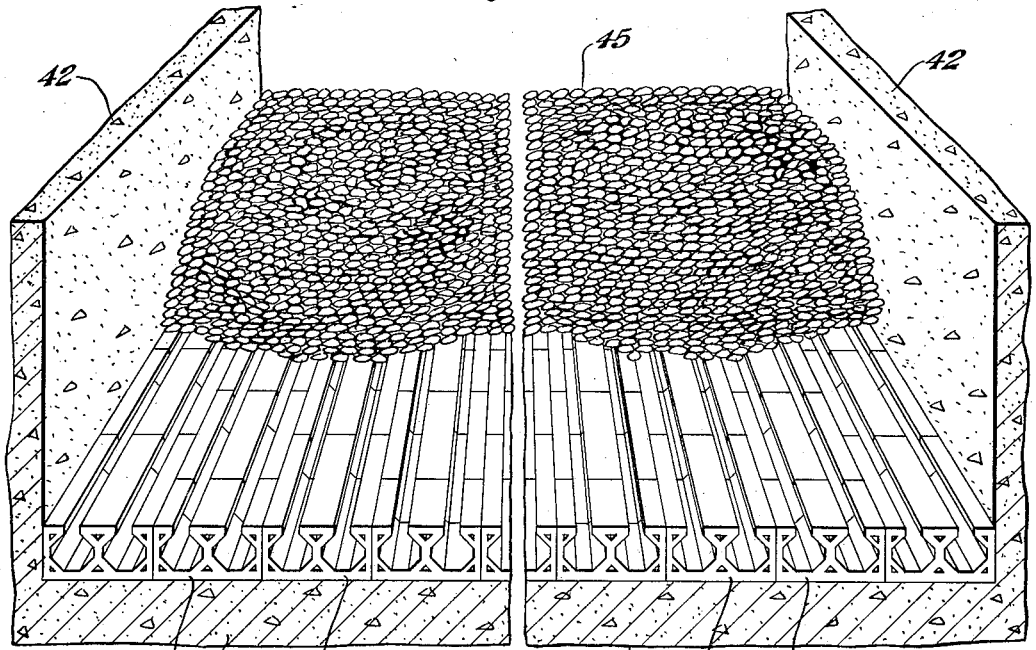
Fig. 6 is a fragmentary end perspective view of a filter bed having its filter floor formed of the improved blocks.

In constructing a trickling filter bed utilizing the improved floor blocks, a concrete foundation indicated generally at 40 in Fig. 6 is first laid, and includes the slab 41 forming the bed for the floor blocks, the side walls 42 and end walls (not shown).

The bed 41 is of sufficient thickness to support the entire load of the floor structure and filter bed, and the top surface of the bed is finished in a smooth plane and slopes downwardly from one end wall to the other end wall to insure a prompt and free flow of purified effluent through the drainage troughs of the floor blocks supported on the bed.

As shown in Fig. 6, the improved filter floor blocks 12' are laid upon the bed 41 end to end to form longitudinal rows extending from one end wall to the other and parallel with the side walls 42. A longitudinal row of the blocks abuts the inner surface of each side wall 42, and all of the intermediate longitudinal rows of the blocks abut laterally each other, so that a complete filter floor is provided covering the entire filter bed without requiring the use of half blocks made by splitting one of the blocks 12' longitudinally.

Preferably, the blocks in each alternate longitudinal row are staggered with respect to the blocks in the other rows requiring the use of half blocks 12" at the end of each alternate longitudinal row of blocks, made by cutting the blocks 12' transversely. The filter bed, which consists of the usual coarse aggregate indicated at 45, is then placed directly upon the floor blocks 12' composing the filter floor, the minimum size of the pieces of the aggregate being slightly greater than the width of the slots 38 as previously stated.

By providing two longitudinal drainage passages with slots in their upper sides in each block 12', a greatly increased number of slots is provided laterally of the filter floor, and the drainage trough capacity provided by each block is greatly increased. This provides for a maximum drainage capacity with reduced height and weight, and the increased slot area per floor unit area amplifies and improves the aeration and ventilation of the effluent trickling through the filter bed into the drainage trough.

Since the side and end walls which retain the aggregate are normally very extensive, and must be constructed to a predetermined height above the upper surface of the floor blocks, reducing the height of the floor blocks reduces the height of the walls, and constitutes a considerable saving in labor and cost of material.

Each block 12' forming part of the filter floor is a complete filter unit, and since the blocks possess a high degree of trueness and accuracy of alignment, the joints between all of the blocks are substantially uniform and accurately interfitted, so that the upper surface of the filter floor as well as the surfaces of the drainage troughs and the drainage slots communicating therewith, are extremely smooth, resulting in extremely free flow and drainage of the sewage effluent.

By providing two drainage troughs in each floor block a minimum number of units is required to form a floor of given area, and the particular design and cross sectional shape of the blocks provides for producing blocks of a size and width facilitating easy handling and at the same time having a maximum drainage capacity.

Subject matter which is described and disclosed but not claimed herein has been made the subject of a companion application copending herewith, Serial No. 692,312, filed October 5, 1933, and entitled Trickling filter floors and blocks therefor.

I claim:

1. The method of making a true and accurately aligned vitrified hollow filter floor block, which includes the steps of extending a hollow column and longitudinally scoring an outer surface of the column along laterally spaced lines, cutting a block from the column, drying the block, cutting through the outer wall of the block at the scoring and removing the longitudinal strip between the cuts, and then burning the block.

2. The method of making a true and accurately aligned vitrified hollow filter floor block, which includes the steps of extruding a hollow column, cutting a block from the column, drying the block, cutting longitudinal slits through an outer wall of the block along laterally spaced lines, removing the longitudinal strip between the slits to form a longitudinal slot, and then burning the block.

3. In a method of making a hollow vitrified filter floor block, the steps of cutting longitudinal laterally spaced slits extending throughout the length of the block through a wall of the hollow block, and removing the longitudinal strip between the slits to form a longitudinal slot after the drying operation and before the burning operation.

4. The method of making a true and accurately aligned hollow vitrified filter floor block having a slot in one wall extending the full length thereof, which includes the steps of extruding a hollow column having a symmetrical cross section from relatively soft clay and simultaneously longitudinally scoring an outer surface of the column along laterally spaced lines, cutting a block from the column, drying the block, cutting through the outer wall from one end to the other of the block along the scoring and removing the longitudinal strip between the cuts to form a slot, and then burning the block.

5. The method of making a true and accurately aligned hollow vitrified filter floor block having a full length slot in one wall thereof, which includes the steps of extruding a hollow column having a symmetrical cross section from relatively soft clay, cutting a block from the column, drying the block, cutting longitudinal laterally spaced slits through an outer wall from end to end of the block, removing the longitudinal strip between the slits to form a slot, and burning the block.

6. The method of making true and accurately aligned hollow vitrified floor blocks having slots extending the full length of one wall thereof, which includes the steps of extruding a hollow symmetrical column of relatively soft clay and longitudinally scoring an outer surface of the column along laterally spaced lines, cutting blocks from the column transversely thereof, drying the blocks on end, cutting through the outer wall along the scoring, removing the longitudinal strips between the cuts to form slots extending longitudinally throughout the length thereof, and then burning the blocks.

JAMES G. BARBOUR.